United States Patent
Chaaraoui et al.

(10) Patent No.: US 12,154,022 B2
(45) Date of Patent: Nov. 26, 2024

(54) METHOD OF TRAINING A TEST SYSTEM FOR MOBILE NETWORK TESTING, TEST SYSTEM AS WELL AS METHOD OF MOBILE TESTING

(71) Applicant: Rohde & Schwarz GmbH & Co. KG, Munich (DE)

(72) Inventors: Alexandros Chaaraoui, Munich (DE); Miguel Roman, Munich (DE); Jack Johnson, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 918 days.

(21) Appl. No.: 17/210,916

(22) Filed: Mar. 24, 2021

(65) Prior Publication Data

US 2021/0326680 A1    Oct. 21, 2021

(30) Foreign Application Priority Data

Apr. 21, 2020    (EP) .................................... 20170617

(51) Int. Cl.
*G06N 3/047*    (2023.01)
*G06N 3/044*    (2023.01)
(Continued)

(52) U.S. Cl.
CPC ............. *G06N 3/047* (2023.01); *G06N 3/084* (2013.01); *H04W 24/06* (2013.01); *G06N 3/044* (2023.01)

(58) Field of Classification Search
CPC ........ G06N 3/047; G06N 3/084; G06N 3/044; G06N 3/048; H04W 24/06; H04L 41/16; H04L 41/5012; H04L 43/50
See application file for complete search history.

(56) References Cited

U.S. PATENT DOCUMENTS 9,451,503 B2     9/2016  Ishida et al.
2019/0220733 A1*  7/2019  Fisher ................... G06N 3/088
(Continued)

FOREIGN PATENT DOCUMENTS

CN         109582864 A      4/2019
EP         3361674 A1       8/2018
(Continued)

OTHER PUBLICATIONS

Zhu, Weijun, Huanmei Wu, and Miaolei Deng. "LTL model checking based on binary classification of machine learning." IEEE access 7 (2019): 135703-135719. (Year: 2019).*

*Primary Examiner* — Sharad Rampuria
(74) *Attorney, Agent, or Firm* — CHRISTENSEN O'CONNOR JOHNSON KINDNESS PLLC

(57) ABSTRACT

A method of training a test system, including: running a predefined set of test procedures on the testing device in order to obtain a temporal test metric; evaluating the temporal test metric via a machine learning model by a processing circuit; and training the machine learning model by the processing circuit to predict a temporal course of a test stability score based on the temporal test metric obtained, wherein the training of the machine learning model is based on the temporal test metric together with a known binary test result, and wherein the temporal course of the test stability score indicates the probability of a respective binary test result throughout the entire duration of a test. A test system and a method for mobile network testing are also described.

19 Claims, 2 Drawing Sheets

(51) Int. Cl.
    *G06N 3/084*     (2023.01)
    *H04W 24/06*     (2009.01)

(56) References Cited

U.S. PATENT DOCUMENTS

2019/0372644 A1*   12/2019   Chen .................... H04W 88/12
2022/0345863 A1*   10/2022   Mueck ................... H04W 4/50

FOREIGN PATENT DOCUMENTS

EP         3525509 A1     8/2019
WO     2014127051 A1     8/2014

\* cited by examiner

METHOD OF TRAINING A TEST SYSTEM FOR MOBILE NETWORK TESTING, TEST SYSTEM AS WELL AS METHOD OF MOBILE TESTING

FIELD OF THE DISCLOSURE

Embodiments of the present disclosure generally relate to a method of training a test system for mobile network testing. Further, embodiments of the present disclosure relate to a test system for mobile network testing as well as a method of mobile network testing.

BACKGROUND

Nowadays, the number of telecommunication networks as well as network communication itself increase so that testing of mobile networks becomes more and more important. For this purpose, operators have to run certain drive testing campaigns with special testing equipment in order to test the mobile network(s). The drive testing campaigns simulate the behavior of mobile subscribers, also called participants, within the mobile network(s) under test wherein the respective behavior relates to incoming/outgoing calls, downloading, uploading, web browsing and/or video playing.

While running the drive testing campaigns, the special testing equipment records network measurement results wherein the measurement data recorded is used to determine the quality of the network for certain services used within the network, in particular the quality of experience (QoE) of the mobile subscribers with regard to the respective services used.

For example, the quality of the network is inter alia assigned to the drop call rate being a network key parameter indicator (KPI), wherein the drop call rate corresponds to the number of calls dropping during the tests by the total number of calls tested. Typically, this rate is very low, for instance between 1-2%. Therefore, a large number of calls has to be performed for obtaining a testing result that is statistically significant. Similar examples include call establishment failures, video re-buffering, or data service accessibility.

Accordingly, several different network key parameter indicators may be used to determine the quality of the network for respective services. Hence, several testing campaigns have to be run (very often due to the statistical significance) in order to obtain the desired information or to obtain sufficient data to evaluate the quality of the services, in particular the quality of experience (QoE) with regard to the respective service(s).

In addition, it is also known to use machine learning techniques in order to solve the problems mentioned above with regard to the statistical significance of the tests performed. However, the training of a machine learning model to be used raises further issues that have to be overcome.

Accordingly, there is a need to provide a simple and cost-efficient possibility to predict the mobile network quality of experience.

SUMMARY

The present disclosure relates to examples of a method of training a test system for mobile testing by using at least one testing device configured to be connected to a mobile network. In an embodiment, the method comprises the steps of:
running a predefined set of test procedures on the at least one testing device in order to obtain at least one temporal test metric, wherein the test procedures running on the at least one testing device simulate the behavior of a participant of the mobile network;
evaluating the at least one temporal test metric via a machine learning model executed or carried out by, for example, a processing circuit; and
training the machine learning model by the processing circuit to predict a temporal course of at least one test stability score based on the at least one temporal test metric obtained. In an embodiment, the training of the machine learning model is based on the at least one temporal test metric together with at least one known binary test result. The temporal course of the at least one test stability score indicates the probability of a respective binary test result throughout the entire duration of a test.

The present disclosure also relates to examples of a test system for mobile network testing. In an embodiment, the test system comprises at least one testing device and a processing circuit configured to execute or carry out a machine learning model to be trained. The processing circuit is configured to receive at least one temporal test metric. The at least one temporal test metric is obtained by running a set of test procedures on the at least one testing device. The processing circuit is configured to evaluate the at least one temporal test metric via the machine learning model. Further, the processing circuit is configured to train the machine learning model to predict a temporal course of at least one test stability score, wherein the temporal course of the at least one stability score indicates a respective binary test result throughout the entire duration of a test.

Aspects of the disclosure are based on the finding that a temporal test metric is gathered when performing the test procedures, wherein the temporal test metric comprises measurement data obtained by the respective test procedures performed. The respective measurement data is gathered over time, resulting in the temporal test metric. Hence, multiple test results are collected over time along the at least one test metric. In some embodiments, the temporal test metric corresponds to a time-based signal metric that is obtained by running the predefined set of test procedures on the at least one testing device that is connected to the mobile network. The metric may be associated with signal strength, signal to noise ratio (SNR), throughput or other known signal metric(s).

Then, the test metric gathered is used for training the machine learning model such that a time-based score, namely the temporal course of the at least one test stability score, is outputted as a result of the machine learning model. For training the machine learning model, the machine learning model receives input data derived from the temporal test metric.

In other words, a time-based mobile network test scoring is outputted by the trained machine learning model. This means that the machine learning model provides a temporal dimension of its result(s).

Generally, the testing device may be connected to the mobile network by an antenna, a cable or any other suitable connection means. The testing device may relate to a mobile device, for instance a user end device such as a mobile phone or a tablet.

As mentioned above, the respective test procedures are used to measure the user experience in the respective network to be tested, namely the mobile network.

Furthermore, the processing circuit that evaluates the at least one temporal test metric for the machine learning model may be provided by the testing device itself, an external device like a server or an offline external device that receives the measurement data associated with the at least one temporal test metric. Accordingly, the results of the tests, namely the measurement data provided by the temporal test metric, may be evaluated on the testing device itself, sent to a server for evaluation or processed offline the offline external device.

In any case, the processing circuit receives the at least one temporal test metric, namely the respective measurement data, as well as at least one known binary test result for training the machine learning model appropriately.

In general, the binary test result may relate, for example, to a call status, a data connection stability, a video quality or any other key performance indicator (KPI) associated with network testing.

Since the machine learning model outputs the temporal course of the at least one test stability score, the user is able to obtain a quality of experience (QoE) score over time. Put differently, the user is able to identify the temporal behaviour of the respective score with respect to the entire duration of the testing.

For instance, the likelihood/probability of a call drop throughout the duration of the testing may be predicted such that the stability of the call can be scored while identifying unstable test segments or degradations of the quality of experience (QoE) during the testing.

In some embodiments, the probability indicated by the test stability score means that the respective score could have all possible discrete values between 0 and 1.

In general, key performance indicators (KPIs) can be derived from the respective test metric, wherein the KPIs determine the quality of service (QoS) and quality of experience (QoE).

Moreover, the network testing is simplified by using the machine learning model in order to predict the respective probabilities. Hence, the time spent for mobile network testing can be reduced significantly once the machine learning model has been trained appropriately since the number of tests may be reduced due to the fact that the statistical significance is no more required in contrast to real mobile network testing.

The training of the machine learning model may correspond to a supervised learning as the machine learning is done with labeled training data that may comprise a set of training examples corresponding to the test metric obtained. Each training example may correspond to a pair consisting of a certain input object (input parameter) as well as a desired output parameter that is also called supervisory signal, namely the binary test result or rather the appropriate scoring. The supervised learning algorithm used by the machine learning model analyzes the training data and generates an inferred mathematical model, for instance a function, which can be used for mapping new examples that go beyond the training examples.

Accordingly, the at least one test metric as well as the binary test result known correspond to a pair which includes of input parameters, namely the test metric and the binary test result known, as well as a desired output parameter, namely the predicted test stability score.

Generally, the at least one binary test result corresponds to a test result classified into two groups/classes on the basis of a classification rule. For instance, the binary test results is assigned to the groups "TRUE" and "FALSE", "PASS" and "FAIL" or rather "POSITIVE" and "NEGATIVE". The at least one binary test result may be assigned to the quality of a respective service, in particular a mobile service.

For instance, a drop call rate is defined by binary test results as the calls are dropped or not so that the drop call rate can be classified by two groups/classes.

In general, the quality of the service (QoS) defined by the prediction of the probability of at least one binary test result may relate to the quality of experience (QoE) of the network participants (users of the network under test). For instance, the quality of the service (QoS) is standardized by IEEE 802.1p The (network) service may relate to an application requiring data from the network to be tested such as a mobile application running on a mobile end device, for instance a service related to a video platform. Moreover, the (network) service may relate to making and/or receiving calls.

According to an aspect, the test procedures running on the at least one testing device simulate calls, web browsing, video playing, uploads and/or downloads. Hence, different behaviours of a participant of the mobile network can be taken into account. For instance, the respective test procedures simulate a corresponding behaviour.

Another aspect provides that the training of the machine learning model is based on different test metrics together with at least one known binary test result. The test metric may be gathered sequentially. The respective metrics may be selected for each specific quality of experience (QoE) test to be scored. In some embodiments, a certain service such as making and/or receiving calls, video watching or browsing may be tested by a corresponding test procedure, resulting in at least one respective temporal test metric.

For example, raw radio access network metrics may be obtained when running the predefined set of test procedures on the at least one testing device. The radio access network (RAN) metrics may be associated with signal strength, signal-to-noise/interference ratio and/or throughput. Typically, the RAN metrics are used to indicate the specific quality of experience (QoE).

In other words, the method relates to a method for training a mobile network testing system based on a (machine learning) binary scoring model. Put differently, the method concerns a method for training a (machine learning) binary scoring model.

Another aspect provides that the machine learning model is defined such that an original scale of the temporal test metric is preserved. This means that the respective model architecture of the machine learning model correlates the at least one test metric and the known binary test result without modifying the original scale of the test metric inputted.

Therefore, the model architecture may use linear transformations. For instance, the model architecture is composed of a single layer of long-short term memory (LSTM) circuits with a linear activation function, a batch normalization layer and/or a fully connected/dense layer with a sigmoid activation.

The LSTM layer relates to an artificial recurrent neural network (RNN) architecture which has feedback connections. The LSTM layer is enabled to process entire sequences of data (such as speech or video). Typically, a LSTM circuit comprises a cell, an input gate, an output gate and a forget gate. The cell remembers values over arbitrary time intervals and the three gates regulate the flow of information into and out of the cell.

The linear activation function takes the inputs, multiplied by weights for each neuron, and creates an output signal proportional to the input.

The batch normalization layer relates to a technique for improving the speed, performance, and stability of artificial neural networks. The batch normalization normalizes the input layer by adjusting and scaling the activations.

In the fully connected/dense layer, every neuron in one layer is connected to every neuron in another layer. In some embodiments, every neuron in one layer is connected to every neuron in another layer and multiplied by a respective weight for each neuron.

Moreover, a dense layer corresponds to, for example comprises, a linear operation in which every input is connected to every output by a weight.

The sigmoid activation function takes a value as input and outputs another value between 0 and 1. However, this is non-linear.

Another aspect provides that the at least one stability score corresponds to a call stability score, a video stability score or a data stability score. Furthermore, the at least one temporal test metric may be associated with a call stability score, a video stability score or a data stability score.

For instance, the temporal test metric may be one of the following for the call stability score of a UMTS/3G call under investigation: Received Signal Code Power (RSCP), quality/cleanliness of the signal (Ec/Io), Transmission Power (TxPower), Receiving Power (RxPower) and/or device speed.

Moreover, the temporal test metric may be one of the following for the call stability score of a LTE/4G call under investigation: Reference Signals Received Power (RSRP), Reference Signal Received Quality (RSRQ), Signal to interference plus noise ratio (SINR), Transmission Power (TxPower) and/or device speed.

In some embodiments, the received signal code power (RSCP) denotes the power measured by a receiver on a particular physical communication channel. It is used as an indication of signal strength, as a handover criterion, in downlink power control, and to calculate path loss. The quality/cleanliness of the signal (Ec/Io) indicates the signal-to-noise ratio. The transmission power and the receiving power indicate the respective powers. The device speed indicates the respective speed of the testing device. Further, Reference Signals Received Power (RSRP) is a measurement of the received power level in an LTE cell network. The Reference Signal Received Quality (RSRQ) relates to the quotient of the RSRP and the Received Signal Strength Indicator (RSSI) that concerns a measurement of the power present in a received radio signal. The signal-to-interference-plus-noise ratio (SINR), also known as the signal-to-noise-plus-interference ratio (SNIR), is a quantity used to give theoretical upper bounds on channel capacity, or the rate of information transfer, in wireless communication systems such as networks.

Furthermore, the video stability score and/or the data stability score may also be assigned to at least one radio access network (RAN) metric.

Another aspect provides that measurement data assigned to the at least one temporal test metric is pre-processed to synchronize measurement data of the test metric, thereby generating pre-processed training data. In some embodiments, a temporal re-sampling of the measurement data obtained, a temporal interpolation of the measurement data obtained and/or a temporal sliding-window data segmentation is performed. The pre-processing results in filling recording gaps occurred during the test procedures performed such that a (substantially) complete temporal test metric is obtained for further processing. This simplifies the evaluation by the machine learning model. For instance, the gaps can be filled easily by means of a temporal re-sampling and/or a temporal interpolation of the measurement data obtained.

Afterwards, the sliding-window data segmentation approach may be used to obtain sequential data of constant duration for further processing. In some embodiments, the respective sequential data of constant duration ensures that feasible data sequence lengths are obtained, wherein the respective length carries sufficient quality and stability information for being processed by the machine learning model.

In some embodiments, the measurement data obtained is doubled with regard to the number of samples during the pre-processing by creating side-flipped test samples for each real test sample. For instance, a respective test procedure may relate to a test involving at least two devices, for instance the testing device as well as another entity such as another testing device or a base station. Therefore, the respective samples obtained can be doubled in a side-flipped manner with regard to the two devices involved. This means that in case of a drop call testing, it was tested that A calls B, wherein respective measurement data is gathered. Then, the respective metric is side-flipped as if B would have called A. Accordingly, a data augmentation is provided.

Furthermore, unbalanced training data is balanced. This can be achieved by partially under-sampling a majority class of the measurement data obtained, for example the training data derived from the measurement data. Alternatively or additionally, a minority class may be over-sampled by creating replicas of the real test samples gathered. In some embodiments, the under-sampling and/oversampling ensures that the training data is balanced, resulting in training data that can be handled in an improved manner by the machine learning model for training purposes. This step generally ensures that highly imbalanced data can be used for predicting the respective score.

Furthermore, input data of the machine learning model may be normalized and/or encoded, thereby obtaining numerical input values. The input data may be derived from the at least one temporal test metric. In some embodiments, the input data may relate to the (pre-processed) training data that may be over- and/or under-sampled previously. The respective processing step ensures that numerical input values are obtained that can be forwarded to the machine learning model for being processed appropriately. Thus, it is ensured that the machine learning model is enabled to interpret the input data appropriately. In other words, this respective processing step is used to convert categorical features into numerical features, namely numerical input values.

The encoding may relate to a one-hot encoding. Generally, one-hot corresponds to a group of bits among which the legal combinations of values are only those with a single high (1) bit and all the others low (0). The respective numerical input values being one-hot encoded can be processed easily without the need of a decoder.

Furthermore, class weights may be used during the training of the machine learning model to compensate at least any remaining imbalance of input data of the machine learning model, for example the (pre-processed, under- and/or over-sampled, normalized and/or encoded) training data. However, the class weights may also be used during the training of the machine learning model to compensate the entire imbalance of input data of the machine learning model. The respective class weights weight the classes differently in order to compensate any remaining imbalances that have not been balanced previously by the under- and/or over-sampling of the respective training data. Accordingly, the classes can be weighted differently by the machine learning model due to the class weights provided by the machine learning model.

However, class weights may also be used solely, namely without any previous balancing.

Generally, the respective balancing steps, namely the pre-balancing and the post-balancing (by the class weights), may be performed individually or together.

Another aspect provides that model weights are trained by backpropagation of a predicted result of the machine learning model in order to minimize a loss function between the known binary test result and the predicted result. The model weights are generally used to improve the prediction performed by the machine learning model. The backpropagation, also called backward propagation of errors, may be performed by backpropagation algorithms known. The loss function may correspond to a binary cross entropy between the predicted result and the known binary test result. Hence, the model weights are set appropriately such that the machine learning model is enabled to learn a respective correlation between the temporal test metric, namely the measurement data associated therewith, and the at least one binary test result of interest that is associated with the test stability score outputted by the machine learning model. The backward propagation of errors, namely deviations between the output of the machine learning model, namely the predicted result, and the known binary test result, is used to tune the model weights in order to reduce the errors.

In some embodiments, the machine learning model may be based on a recurrent neural network (RNN) that is a class of artificial neural networks where connections between nodes form a directed graph along a temporal sequence. This allows it to exhibit temporal dynamic behaviour.

Furthermore, the present disclosure provides examples of a method for mobile testing by using at least one testing device to configure to be connected to a mobile network. In an embodiment, the method comprises the steps of:
- providing a trained test system configured to predict the probability of at least one binary test result by running a trained machine learning model;
- performing a test on the at least one testing device, thereby obtaining at least one test result;
- forwarding the test result of the test to the trained test system for evaluating the test result; and
- obtaining a prediction regarding the probability of a respective binary test result throughout the entire duration of the test performed.

Accordingly, the test system as described above and/or the trained machine learning model as described above are/is used in order to perform the respective mobile network testing. In other words, the already trained machine learning model is used for testing purposes.

Accordingly, test data is processed by using the previously trained machine learning model to obtain a prediction of the probability of the binary test result, wherein a temporal sequence of scores is outputted, wherein the scores indicate the probability of the respect binary test result throughout the entire duration of the test.

Concerning the advantages, reference is also made to the explanations above.

Further, the test result obtained may correspond to at least one temporal test metric encompassing test data. Thus, the respective test performed may correspond to a single test.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In some embodiments described herein, the term "module," "unit," "instrument," "device," etc., refers to or includes, inter alia, a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

Figure 1:
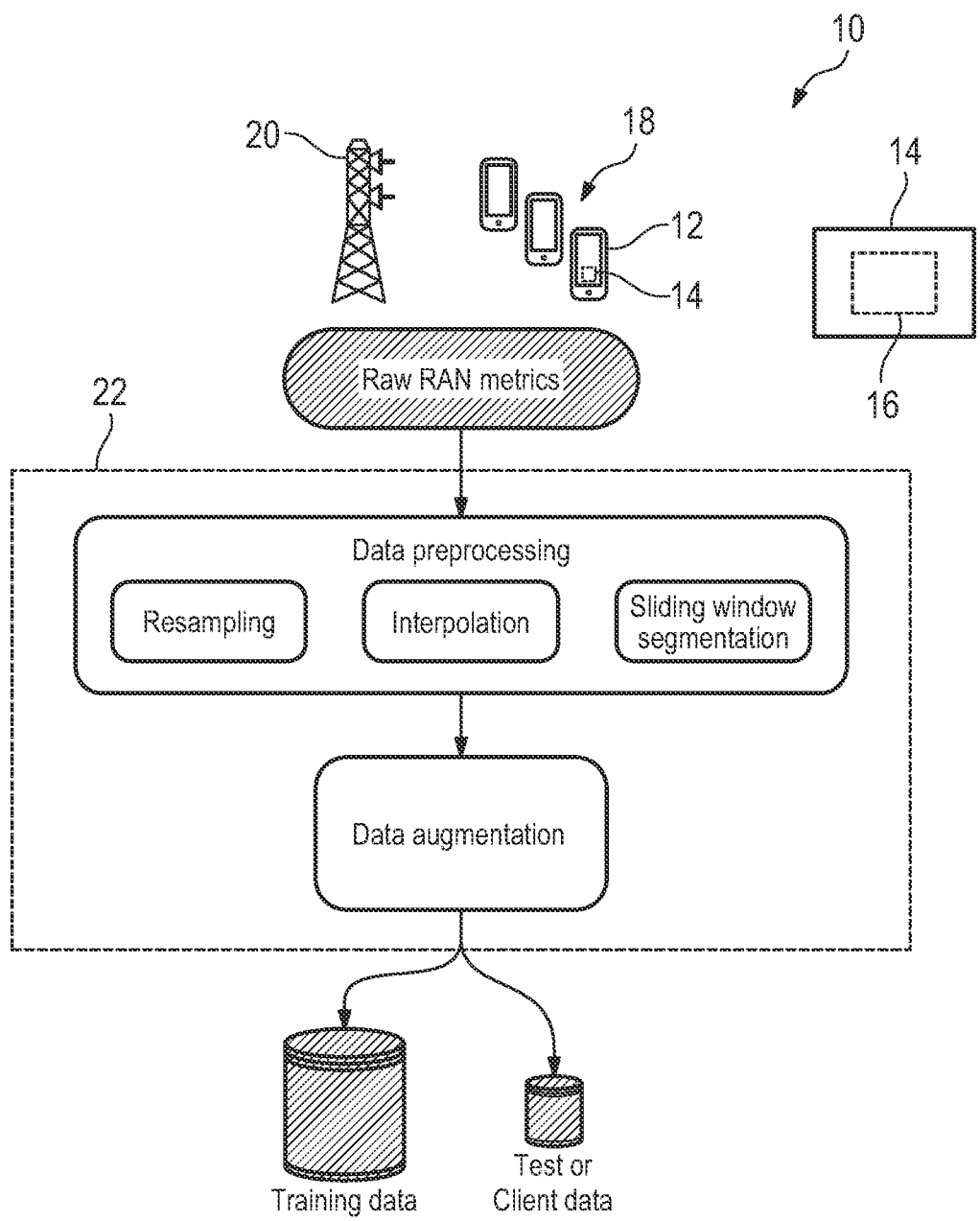
FIG. 1 schematically shows an overview of a representative data preparation method used by a method of training a test system according to an embodiment of the present disclosure.

FIG. 1 shows an overview that illustrates a test system 10 for mobile network testing that comprises at least one testing device 12 as well as a processing circuit 14. In the shown embodiment, the processing circuit 14 is provided by the testing device 12 itself. However, the processing circuit 14 may also be established by an external device 16, for instance a server that may communicate with the testing device 12 or rather an offline device that receives respective data for evaluation as will be described later in more detail.

In general, the processing circuit 14 comprises a machine learning model that is trained as will be described later such that the trained machine learning model can be used to predict a temporal course of at least one test stability score that is associated with a network to be tested. The testing device 12 is connected with the network via a cable or in a wireless manner by an appropriate network interface 18 that may be provided by an antenna or a cable connection, for example. In the shown embodiment, the network to be tested is provided by a mast or rather a base station 20.

The testing device 12 includes circuitry generally configured to run a predefined set of test procedures in order to obtain measurement data that is encompassed in at least one temporal test metric. In the shown embodiment, several raw radio access network (RAN) metrics are obtained as a result of the test procedures performed by the testing device 12.

In general, the test procedures run on the at least one testing device 12 simulate the behaviour of a participant of the mobile network to be tested. This means that the test procedures may simulate incoming/outgoing calls, video playing, web browsing, uploads and/or downloads, for example.

The measurement data or at least the respective temporal test metric is forwarded to, for example, a pre-processing module 22. In general, the pre-processing module 22 includes circuitry configured to pre-process the measurement data associated with the at least one temporal test metric in order to synchronize the measurement data obtained and/or to fill any recording gaps between the measurement data. For this purpose, a temporal resampling and/or temporal interpolation of the measurement data may be performed by the pre-processing module 22.

Afterwards, the pre-processing module 22 performs a sliding-window data segmentation in order to obtain sequential data of constant duration. Hence, data is generated that has a feasible data sequence length that carries sufficient quality and stability information for further processing.

In addition, the pre-processing module 22 may perform a data augmentation. This might be necessary in case of tests performed that involve more than one testing device 12 such as calls since a call is typically established between a first participant and a second participant, namely a first subscriber and a second subscriber. The respective participants may correspond to testing devices 12 or rather a testing device 12 and another entity.

The data augmentation results in a doubling of the respective real samples gathered by means of creating side-flipped test samples for the real test samples. In case of a call, it is assumed that A calls B, wherein the side-flipping means that the respective real test sample associated with "A calls B" is side-flipped in order to obtain the side-flipped test sample associated with "B calls A". Accordingly, the number of samples is doubled for the measurement data obtained by such a test involving two participants.

Afterwards, pre-processed training data is provided that can be forwarded to the processing circuit 14 for training the machine learning model. This is illustrated in more detail in FIG. 2.

The respective pre-processing steps are optional. However, these steps ensure a data preparation of the raw measurement data provided by the raw RAN metrics, namely the temporal test metrics.

In some embodiments, the pre-processing module 22 may be part of the processing circuit 14 such that the measurement data obtained by the test procedures is pre-processed within the processing circuit 14. Alternatively, the pre-processing module 22 is formed separately of the processing circuit.

Figure 2:
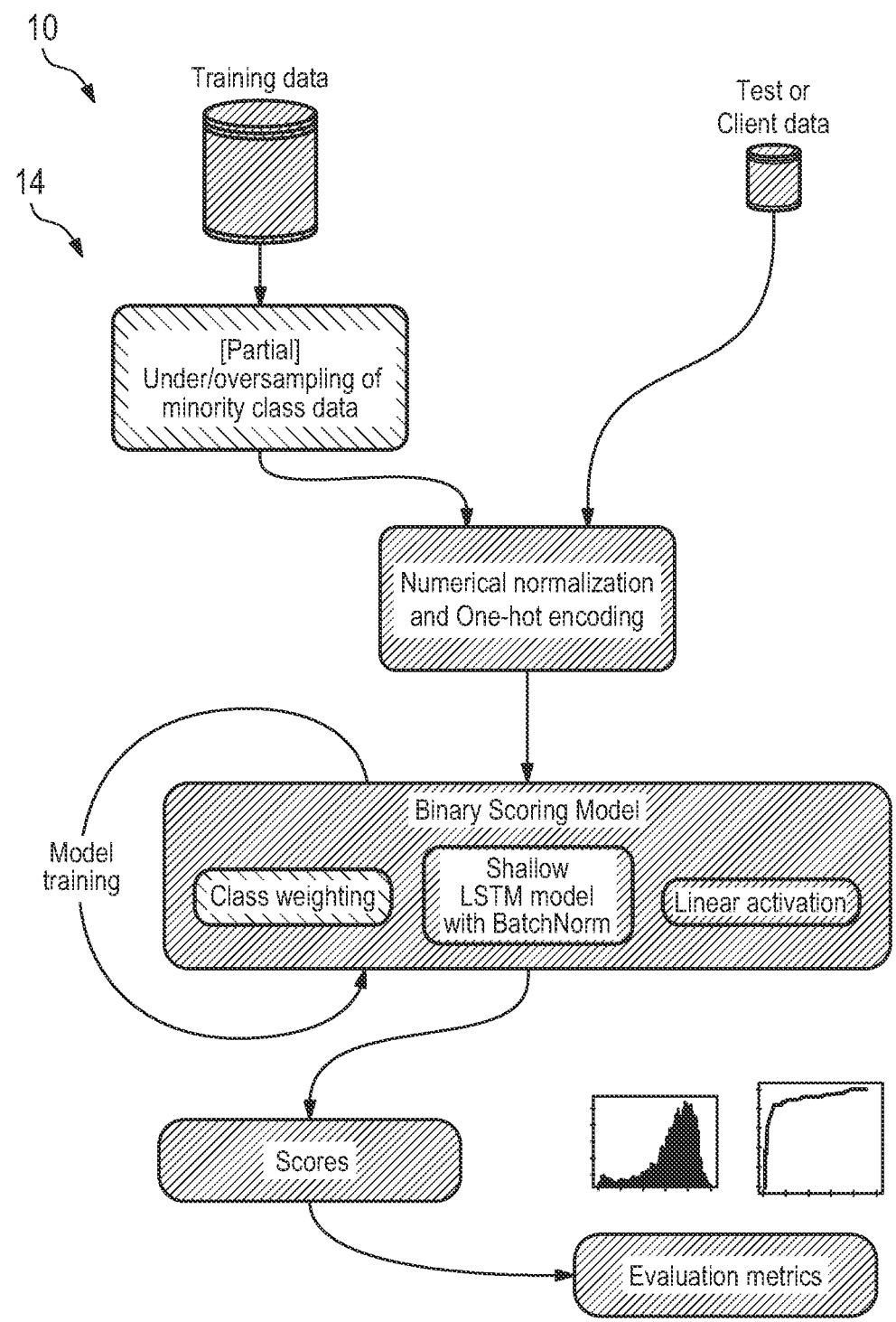
FIG. 2 shows an overview of a portion of the method of training a test system according to an embodiment of the present disclosure.

In FIG. 2, it is shown that the (pre-processed) training data is further processed by the processing circuit 14 prior to being inputted to the machine learning model for training purposes.

In some embodiments, the (pre-processed) training data derived from the raw measurement data may contain highly imbalanced data since, in the example of dropped calls, typically less than 1% of the samples may represent a dropped call. Accordingly, the two classes associated therewith, for instance "dropped call—TRUE" and "dropped call—FALSE", are highly imbalanced since one class is associated with less than 1% of the measurement data whereas the other class is associated with more than 99% of the measurement data.

In order to avoid a biased machine learning model, the respective training data derived from the temporal test metric undergoes a balancing process. Therefore, the training data associated with a majority class may be undersampled to the best performing ratio.

Alternatively or additionally, the training data associated with a minority class is oversampled by creating replicas of the real test samples encompassed in the training data. The respective step of balancing may be performed on the entire training data or rather on parts of the training data.

The resulting data, namely the (balanced and/or pre-processed) training data, is further processed in order to obtain input values that can be forwarded to the machine learning model. Therefore, the respective data is normalized and/or encoded, for example one-hot encoded. This ensures a numerical stability.

In addition, categorical features are converted into numerical features that can be processed by the machine learning model appropriately. In some embodiments, the numerical input values are obtained that are inputted into the machine learning model that is labelled as binary scoring model.

The machine learning model receives the respective input data derived from the training data that in turn was derived from the raw measurement data. When processing the input data, the machine learning model applies class weights on the respective input data to compensate any remaining imbalances of the training data that were not compensated previously.

The machine learning model further comprises a shallow neural network architecture with linear transformation that ensures to preserve the original scale of the temporal test metric inputted. Hence, it is ensured that the machine learning model outputs a score rather than a classification. Therefore, the machine learning model is labelled as a binary scoring model.

Specifically, the machine learning model architecture is composed of a single layer of long-short term memory (LSTM) circuits with a linear activation function, a batch normalization layer and/or a fully connected/dense layer with sigmoid activation.

Furthermore, the machine learning model has model weights that are set/tuned by means of a backpropagation of the predicted output in order to minimize a loss function between the known binary test result inputted and the predicted result of the machine learning model.

In some embodiments, the machine learning model is configured to output a temporal course of at least one test stability score based on the at least one temporal test metric, wherein the temporal course of the at least one test stability score indicates the probability of a respective binary test result throughout the entire duration of a test performed.

In the shown embodiment, several test stability score values, labelled by scores, are outputted that are associated with different times. These test stability score values together result in the temporal course of the at least one test stability score.

In other words, an evaluation metric can be outputted by the machine learning model as schematically illustrated in FIG. 2.

It is to be noted that any evaluation metric refers to complementary information generated by the method besides the scores, e.g. a histogram and a Receiver Operating Characteristic (ROC) curve. In some embodiments, the output of the evaluation metric is optional.

Accordingly, the machine learning model was trained appropriately such that it can be used for mobile network testing.

The respective steps of mobile network testing are also illustrated in FIGS. 1 and 2 since the mobile network testing can be performed by the test system 10 in a (substantially) similar manner.

In some embodiments, at least one test is performed on the at least one testing device 12, thereby obtaining at least one test result as shown in FIG. 1. The test result obtained may also relate to a temporal test metric such as at least one raw RAN metric.

The test result obtained is forwarded to the trained machine learning model as described above, wherein the test result, namely the at least one raw RAN metric, may also undergo the respective steps performed by the pre-processing module 22, namely resampling, interpolation, sliding window segmentation and/or data augmentation. Accordingly, test or client data is provided at the end of the data preparation process.

As shown in FIG. 2, the test or client data may also be normalized and/or encoded in a similar manner as described above, thereby providing the input data for the machine learning model trained.

The machine learning model is configured to evaluate the input data derived from the at least one test result in a similar manner as the training data, resulting in a prediction regarding the probability of a respective binary test result throughout the entire duration of the test performed, namely the several test stability score values, labelled by scores, that are associated with different times. These test stability score values together result in the temporal course of the at least one test stability score. In other words, an evaluation metric can be outputted by the machine learning model.

Accordingly, only the steps of balancing as well as the adaption of the weights are not performed during the mobile network testing since these respective steps are only performed during the training of the machine learning model.

Certain embodiments disclosed herein, for example the respective module(s) and unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of the aforementioned components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of training a test system for mobile network testing by using at least one testing device configured to be connected to a mobile network, comprising:
   running a predefined set of test procedures on the at least one testing device in order to obtain at least one temporal test metric,
   wherein the test procedures running on the at least one testing device simulate the behavior of a participant of the mobile network;
   evaluating the at least one temporal test metric via a machine learning model by a processing circuit; and
   training the machine learning model by the processing circuit to predict a temporal course of at least one test stability score based on the at least one temporal test metric obtained,
   wherein the training of the machine learning model is based on the at least one temporal test metric together with at least one known binary test result, and wherein the temporal course of the at least one test stability score indicates the probability of a respective binary test result throughout the entire duration of a test,
wherein the at least one test stability score corresponds to a call stability score, a video stability score or a data stability score and/or wherein the at least one temporal test metric is associated with a call stability score, a video stability score or a data stability score.

2. The method according to claim 1, wherein the test procedures running on the at least one testing device simulate calls, web browsing, video playing, uploads and/or downloads.

3. The method according to claim 1, wherein the training of the machine learning model is based on different test metrics together with at least one known binary test result.

4. The method according to claim 1, wherein raw radio access network metrics are obtained when running the predefined set of test procedures on the at least one testing device.

5. The method according to claim 1, wherein the machine learning model is defined such that an original scale of the temporal test metric is preserved.

6. The method according to claim 1, wherein measurement data assigned to the at least one temporal test metric is pre-processed to synchronize measurement data of the test metric, thereby generating pre-processed training data.

7. The method according to claim 6, wherein a temporal re-sampling of the measurement data obtained, a temporal interpolation of the measurement data obtained and/or a temporal sliding-window data segmentation is performed.

8. The method according to claim 6, wherein the measurement data obtained is doubled with regard to the number of samples during the pre-processing by creating side-flipped test samples for each real test sample.

9. The method according to claim 1, wherein unbalanced training data is balanced.

10. The method according to claim 1, wherein input data of the machine learning model is normalized and/or encoded, thereby obtaining numerical input values.

11. The method according to claim 10, wherein the input data corresponds to the at least one temporal test metric as well as the at least one known binary test result.

12. The method according to claim 1, wherein class weights are used during the training of the machine learning model to compensate at least any remaining imbalance of input data of the machine learning model.

13. The method according to claim 1, wherein class weights are used during the training of the machine learning model to compensate at least any remaining imbalance of the training data.

14. The method according to claim 1, wherein model weights are trained by means of backpropagation of a predicted result of the machine learning model in order to minimize a loss function between the known binary test result and the predicted result.

15. A test system for mobile network testing, comprising:
at least one testing device; and
a processing circuit configured to run a machine learning model to be trained, wherein the processing circuit is configured to:
receive at least one temporal test metric, wherein the at least one temporal test metric is obtained by running a set of test procedures on the at least one testing device;
evaluate the at least one temporal test metric via the machine learning model; and
train the machine learning model to predict a temporal course of at least one test stability score,
wherein the temporal course of the at least one test stability score indicates a respective binary test result throughout the entire duration of a test,
wherein the at least one test stability score corresponds to a call stability score, a video stability score or a data stability score and/or wherein the at least one temporal test metric is associated with a call stability score, a video stability score or a data stability score.

16. A method of mobile network testing by using at least one testing device configured to be connected to a mobile network, comprising:
providing a trained test system configured to predict the probability of at least one binary test result by running a trained machine learning model by a processing circuit;
performinga test on the at least one testing device, thereby obtaining at least one test result;
forwarding the test result of the test to the trained test system for evaluating the test result; and
obtaining a prediction regarding the probability of a respective binary test result throughout the entire duration of the test performed,
wherein the binary test results relate to a call status, a data connection stability, a video quality or a key performance indicator (KPI) associated with the network testing.

17. The method according to claim 16, wherein the test result obtained corresponds to at least one temporal test metric encompassing test data.

18. The method according to claim 16, wherein the trained test system comprises at least one testing device and a processing circuit configured to run a machine learning model to be trained, wherein the processing circuit is configured to receive at least one temporal test metric, wherein the at least one temporal test metric is obtained by running a set of test procedures on the at least one testing device, wherein the processing circuit is configured to evaluate the at least one temporal test metric via the machine learning model, and wherein the processing circuit is configured to train the machine learning model to predict a temporal course of at leastone test stability score, wherein the temporal course of the at least one test stability score indicates a respective binary test result throughout the entire duration of a test, and wherein the at least one test stability score corresponds to a call stability score, a video stability score or a data stability score and/or wherein the at least one temporal test metric is associated with a call stability score, a video stability score or a data stability score.

19. The method according to claim 16, wherein the machine learning model is trained by a method of training the test system for mobile network testing by using at least one testing device configured to be connected to a mobile network, comprising:
running a predefined set of test procedures on the at least one testing device in order to obtain at least one temporal test metric, wherein the test procedures running on the at least one testing device simulate the behavior of a participant of the mobile network;
evaluating the at least one temporal test metric via a machine learning model by a processing circuit; and
training the machine learning model by the processing circuit to predict a temporal course of at least one test stability score based on the at least one temporal test metric obtained, wherein the training of the machine learning model is based on the at least one temporal test metric together with at least one known binary test result, and wherein the temporal course of the at least one test stability score indicates the probability of a respective binary test result throughout the entire duration of a test,
wherein the at least one test stability score corresponds to a call stability score, a video stability score or a data stability score and/or wherein the at least one temporal test metric is associated with a call stability score, a video stability score or a data stability score.

* * * * *